Patented Oct. 10, 1944

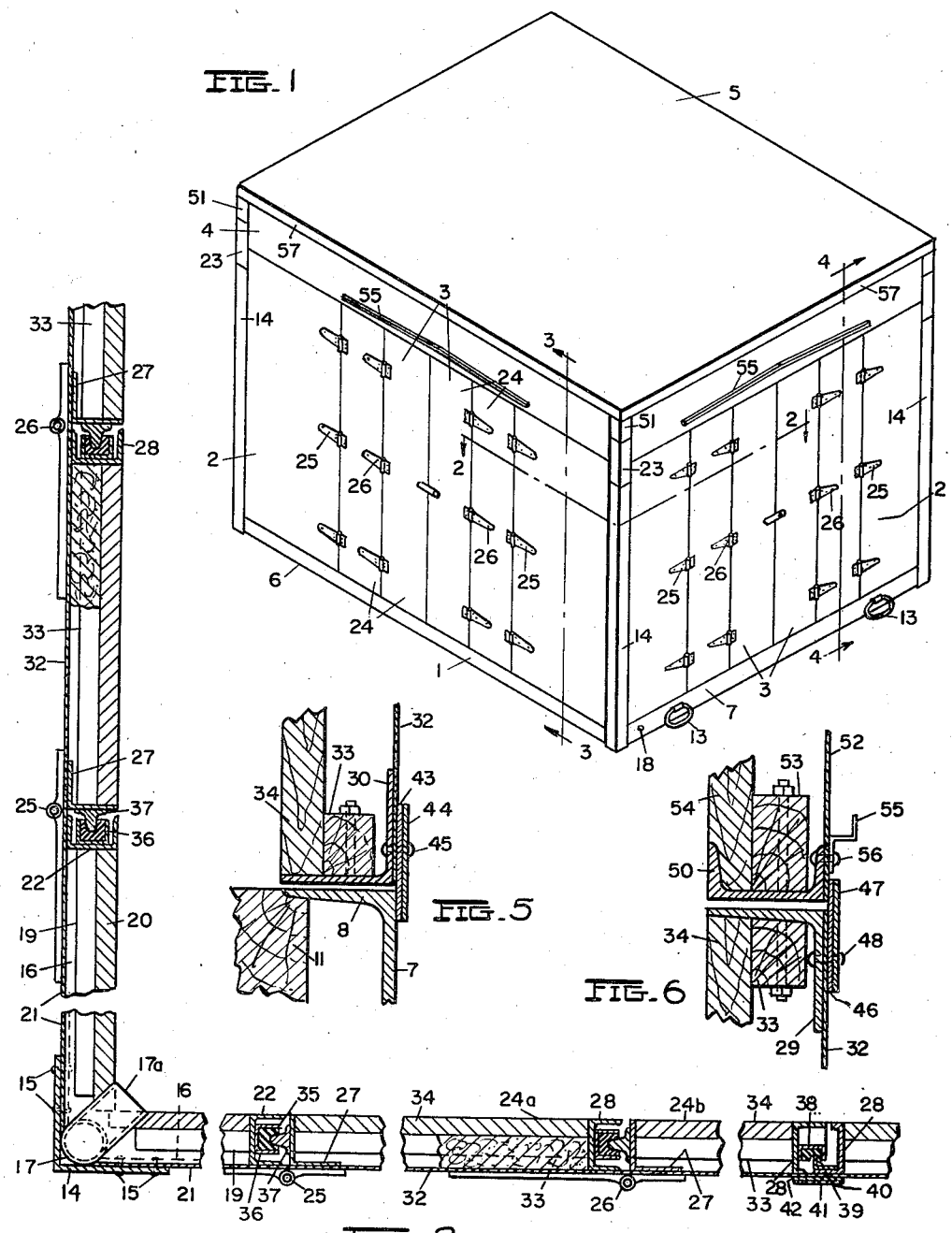

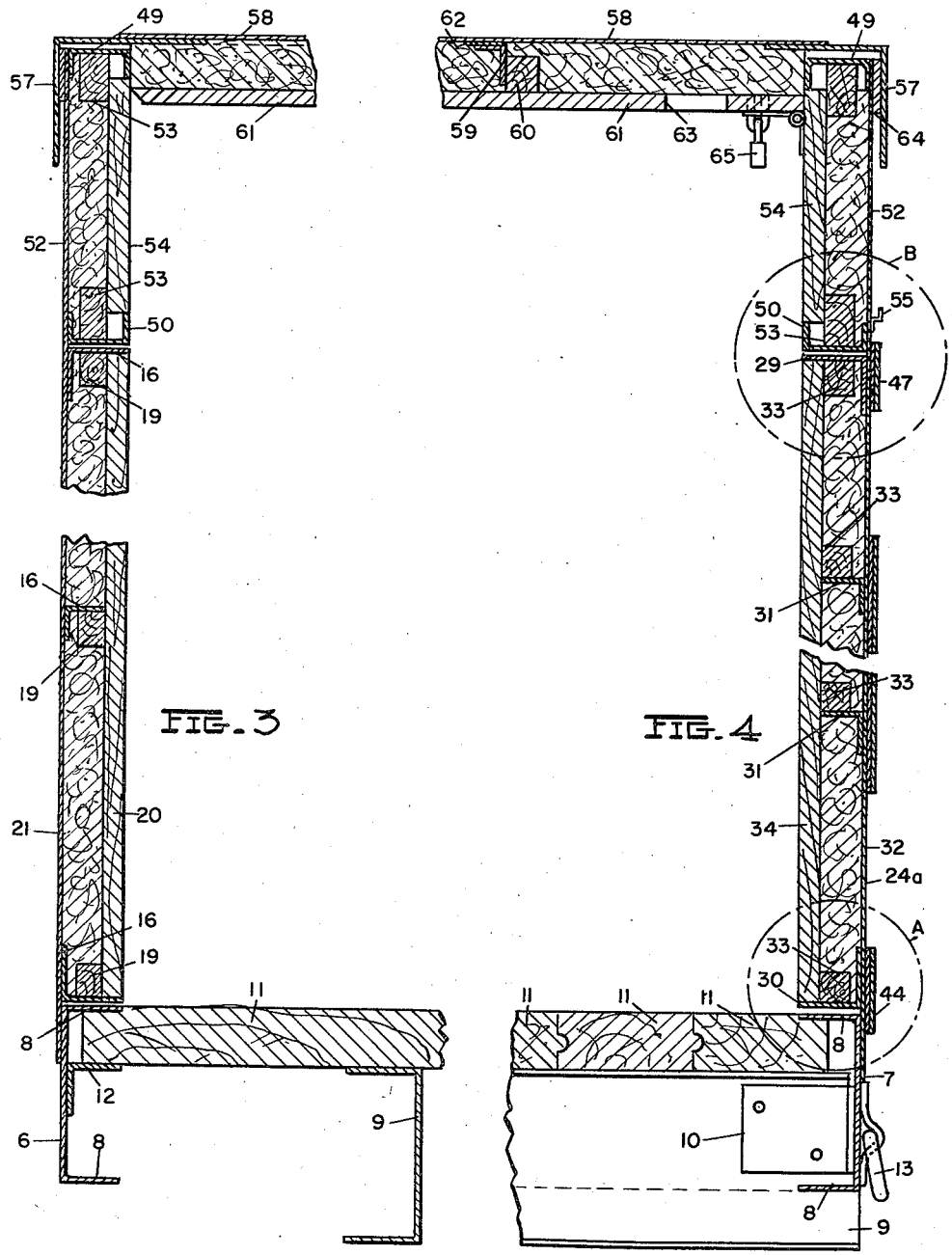

2,360,232

UNITED STATES PATENT OFFICE 2,360,232

CORNICE AND COVER FOR CONTAINERS

Alexander Howie, Shaker Heights, Ohio

Original application April 1, 1936, Serial No. 72,170. Divided and this application June 4, 1941, Serial No. 396,598

1 Claim. (Cl. 220—1.5)

This invention relates, as indicated, to containers, but has reference more particularly to the type of container known as an "outer" container, and which is usable in lieu of freight car or highway truck bodies.

Containers of this type may have various forms and dimensions, but must conform to railroads and highway clearance limits, as well as to those of industry. The maximum width of a railroad car is governed by the clearance line established for general interchange service, which is now 10'9". The maximum overall width of highway vehicles has been established at 8'0" in all but two of the forty-eight states. Similarly, there are overall height limitations for highway vehicles and structures, the minimum overhead clearance on most main highways not exceeding 12'6". With most highway truck platforms nearly 4'6" above the road surface, the overall height of an outer container should not exceed 8'0" for general service. Doors and openings in plant buildings and warehouses may impose even smaller overall dimensions for containers. Less definite limitations are imposed by existing standard lengths and load limits of railroad freight cars and of highway vehicles, but such standards must be considered in determining container dimensions.

In view of the aforesaid dimensional limitations, it has been tentatively determined that an outer container, of the dimensions—length, 10 ft., width, 8 ft., height, 8 ft., and having a load capacity of 500 cu. ft. and 25,000 pounds could be utilized to carry approximately 85% of all tonnage suitable for carriage on freight-carrying vehicles, and would thereby greatly increase the efficiency of such vehicles.

It is a primary object of the present invention to provide a container of the character described, which is designed for fast and economical freight service, can be used to carry efficiently a large proportion of all dry materials, in bulk or packaged, which is usable interchangeably on all land and water transport vehicles, which will stimulate regular scheduled movements of goods in quantities desired by shippers and consigners and which will greatly reduce empty return hauls by rail and highway now required because present freight vehicles are not adapted to carry a sufficiently wide variety of goods.

Further objects of the invention are to provide a container which is adapted to permit handling thereof by lift-truck, rolling, sliding and hoisting, and which is suitable for handling products of a perishable nature.

To the accomplishment of the foregoing and related ends, said invention, then, consists of the means hereinafter fully described and particularly pointed out in the claim.

The annexed drawings and the following description set forth in detail certain structure embodying the invention, such disclosed means constituting, however, but one of various structural forms in which the principle of the invention may be used.

In said annexed drawings:

Fig. 1 is a perspective view of a container embodying the invention; Fig. 2 is a fragmentary cross-sectional view, taken on the line 2—2 of Fig. 1; Fig. 3 is a fragmentary cross-sectional view, taken on the line 3—3 of Fig. 1; Fig. 4 is a fragmentary cross-sectional view, taken on the line 4—4 of Fig. 1; Fig. 5 is a detail, on an enlarged scale, of the portion of the structure indicated by the circle A in Fig. 4; and Fig. 6 is a detail, on an enlarged scale, of the portion of the structure indicated by the circle B in Fig. 4.

The container, as shown in Fig. 1, comprises a base or bottom 1, wall units 2, door units 3, a cornice unit 4 and a top or cover 5.

The base 1 consists of four structural channels 6 and 7 which are welded to each other at their ends to form a substantially rectangular frame, the flanges 8 of these channels extending inwardly towards the interior of the frame.

The base further includes skid channels 9, the webs of which are recessed to receive the lower flanges of the channels 7, which are welded to the channels 9 along the recesses. Additional means, such as angle clips 10, are provided for securing the ends of the skid channels 9 to the webs of channels 7. The upper flanges of the skid channels lie in a plane somewhat below the plane of the upper flanges of channels 6 and 7, thereby providing space for a floor which may consist of boards 11 of hardwood or the like. Portions of the outermost boards underlie the flanges of channels 7, while the ends of the boards underlie the upper flanges of channels 6 and rest on angles 12 secured to the channels 6 and extending longitudinally thereof. Rings 13 may be secured to the channels 7 to facilitate hoisting of the container.

The wall units 2 are identical with each other in construction, so that a description of one unit will be sufficient.

Each wall unit consists of a vertically extending angle 14, to each leg of which is secured, as by rivets 15, a plurality of vertically spaced horizontally extending angles 16, these angles being spaced sufficiently close together to provide the requisite strength. The lowermost angles 16 rest on the upper flanges of channels 6 and 7, and the angle 14 extends sufficiently below such lowermost angle to provide a portion for attachment, as by bolting to the abutting webs of channels 6 and 7. Channels may be employed in lieu of the angles 16.

The ends of the angles 16 which are secured to the angle 14 are spaced from each other to provide a space for a conduit 17, which extends from a point adjacent the lower end of angle 14 to any desired point adjacent the uppermost angles 16. This conduit may be utilized for the purpose of supplying refrigerated air for suitably conditioning the interior of the container. An inlet 18 may be provided in the channel 7 for connection to the lower end of conduit 17.

Secured to each of the angles 16 is a wood nailer strip 19, these strips providing means for the attachment of wood sheathing 20, which forms the lining or interior wall of the container. Instead of wood sheathing, plates or panels of corrugated metal may be used. The outer walls of the wall unit are formed by sheet-metal panels or plates 21, preferably of corrosion-resistant metal. The plates 21, may be secured in position by the same rivets which secure the angles 16 to the angles 14, or in any other desired manner, and are secured at their other vertical edges to vertically extending channels 22. The channels 22 are secured, as by suitable angle clips (not shown) to the ends of angles 16 and abut the edges of the wood sheathing 20. The upper end of conduit 17 has an outlet 17a which extends through a suitable opening in the wood sheathing so as to conduct the refrigerated air into the container. The angle 14 of each wall unit extends to the level of the uppermost angles 16, and secured to each of the angles 14 is an angle member 23 which serves to removably connect the wall unit to the cornice unit 4, as will be apparent from Fig. 1.

The space between the plates 21 and the sheathing 20 is adapted to be filled with a suitable insulating material, such, for example, as mineral wool.

Each side of the container is provided with a door unit 3, which extends between the opposed channels 22 of the corner units.

The door units are similar in construction to the wall units, and each consists of a pair of doors 24. Each door is secured as by hinges 25 to one of the wall units and consists of two panels 24a and 24b secured to each other as by hinges 26. Each panel of the door consists of a rectangular frame which comprises a vertically extending angle 27, a vertically extending channel 28 and top and bottom angles 29 and 30 respectively. Additional horizontal angles 31 are provided, and a sheet metal outer plate 32 is secured to the frame and angles 31. Nailer strips 33 are secured to the angles 29, 30 and 31 and serve for the attachment of wood sheathing 34, as in the wall units, the space between the plates 32 and sheathing 34 being filled with suitable insulating material.

For the purpose of obtaining a water-tight seal between the door units and the corner units, there is secured to the web of each of the channels 22 a pressed-metal channel 35 containing a strip 36 of rubber of channel-shaped cross-section and providing a seat for engagement by the vertical member of a strip 37 of fibre or the like of T-section, and which is secured to the door frame angle 27. A similar water-tight seal is maintained between each of the door panels 24a and 24b.

A similar water-tight seal is provided between the doors of each door unit when closed and consists of a rubber-lined channel 38 secured to the channel 28 of one of the panels 24b and an angle strip 39 secured to the channel 28 of the corresponding panel of the other door.

Secured to one of the channels 28, as by rivets 40 and metal strip 41 is a strip of rubber 42 which serves to seal the joint between the channels 28 when the doors are closed. Similar rubber sealing strips 43 are provided at the lower edges of the doors to provide a water-tight joint between the doors and the base, these strips being maintained in position by means of metal strips 44, which are secured to the angles 30 as by rivets 45. Rubber sealing strips 46 are likewise provided at the upper edges of the doors and are maintained in position by means of metal strips 47 and rivets 48.

The cornice unit 4 comprises a substantially rectangular frame consisting of upper and lower channels 49 and 50 respectivly, which are maintained in spaced relation by means of corner angles 51, these angles serving to secure sheet metal plates 52 to the channels. Wood nailer strips 53 are secured to the channels 49 and 50 and serve for the attachment of wood sheathing 54, which forms the inner wall of the cornice unit. The space between the plates 52 and sheathing 54 may be filled with insulating material.

For the purpose of preventing excessive flow of water on the doors during rainy weather, a sheet-metal gutter 55 is disposed over the doorways and is secured to the cornice unit as by rivets 56. This gutter, as will be apparent, will divert the flow of water past both sides of the doorway.

The top or cover 5 is of a construction similar to that of the other units and comprises a substantially rectangular frame made of angles 57 which are welded or otherwise secured to each other at their ends, the downwardly extending legs of these angles being spaced somewhat from the exterior walls of the cornice unit to provide a space through which air may enter. These angles serve for the attachment of a sheet-metal top plate 58, to which are secured angles 59 supporting nailer strips 60. The nailer strips serve for the attachment of wood sheathing 61, which forms the top interior wall of the container. Filler strips 62 are interposed between the plate 58 and angles 59 so as to space the horizontal legs of frame angles 57 from the upper surfaces of the cornice unit, when the cover is in position, as shown in Fig. 4. Portions of the cover may be filled with insulating material, if desired. Air vents 63 are provided in the sheathing 61 adjacent the edges, so that air which enters the space between the cornice unit and cover may have access to the interior of the container. For the purpose of filtering this air, filter means 64 is provided, which is secured to the downwardly extending legs of angles 57.

The cover is removably secured to the cornice unit as by locking means 65 adapted to be actuated from the inside of the container, it being understood that the container is of such size that a man of average size may readily enter and leave the container through the doors thereof.

Suitable locking means (not shown) is also provided for the doors of the container.

A container, as thus made, is extremely sturdy and well adapted for the carriage of a large variety of freight. Being substantially rain-proof and well ventilated, injury or damage to goods in transit is avoided, particularly in the case of perishable goods. Being constructed of standard structural shapes and materials readily obtainable in the open market, replacements of worn out or defective parts is greatly facilitated, so that the delays and expense incident to the securing of parts of special and intricate design is avoided.

This application is a division of my co-pending application, Serial Number 72,170, filed April 1, 1936, entitled "Container."

Other modes of applying the principle of my invention may be employed instead of the one explained, change being made as regards the structure herein disclosed, provided the means stated by the following claim or the equivalent of such stated means be employed.

I therefore particularly point out and distinctly claim as my invention:

In a container of the character described, a cornice unit, a cover mounted thereon and comprising a frame including angle irons extending along the periphery of said cover, said angle irons each having a horizontal flange spaced vertically from the upper edge of said cornice unit and a depending flange spaced from the outer walls of said cornice unit, the resulting spaces admitting air into the interior of said container.

ALEXANDER HOWIE.